(12) United States Patent
Tanase et al.

(10) Patent No.: US 12,712,896 B2
(45) Date of Patent: Aug. 18, 2026

(54) NETWORK DEVICE AND METHOD OF OPERATION OF A DEVICE IN A NETWORK

(71) Applicant: NXP USA, Inc., Austin, TX (US)

(72) Inventors: Cristian Alexandru Tanase, Bucharest (RO); Alexandru Porosanu, Bucharest (RO); Bogdan-Tudor Sandu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 18 days.

(21) Appl. No.: 18/892,011

(22) Filed: Sep. 20, 2024

(65) Prior Publication Data

US 2025/0119439 A1 Apr. 10, 2025

(30) Foreign Application Priority Data

Oct. 10, 2023 (RO) ............................... A202300566

(51) Int. Cl.
*H04L 9/40* (2022.01)

(52) U.S. Cl.
CPC ...... *H04L 63/1416* (2013.01); *H04L 63/0435* (2013.01); *H04L 63/1425* (2013.01)

(58) Field of Classification Search
CPC ............. H04L 63/1416; H04L 63/0435; H04L 63/1425; H04L 63/14; H04W 12/12; H04W 84/18
See application file for complete search history.

(56) References Cited

U.S. PATENT DOCUMENTS

| | | | | |
|---|---|---|---|---|
| 7,107,619 | B2 | 9/2006 | Silverman | |
| 7,515,926 | B2 | 4/2009 | Bu et al. | |
| 10,182,329 | B1 * | 1/2019 | Roths ...................... | H04W 4/70 |
| 10,382,480 | B2 | 8/2019 | Reddy et al. | |
| 2009/0323969 | A1 * | 12/2009 | Nishi ...................... | H04J 13/00 380/281 |

(Continued)

FOREIGN PATENT DOCUMENTS

| | | | |
|---|---|---|---|
| EP | 2719212 | B1 | 4/2020 |
| EP | 3925161 | B1 | 10/2022 |

OTHER PUBLICATIONS

Chen et al.: "A Novel Low-Rate Denial of Service Attack Detection Approach in ZigBee Wireless Sensor Network by Combining Hilbert-Huang Transformation and Trust Evaluation," IEEE Access, Special Section on Security and Privacy for Cloud and Iot, Received Feb. 15, 2019, accepted Mar. 5, 2019, date of publication Mar. 8, 2019, date of current version Mar. 26, 2019, Digital Object Identifier 10.1109/ACCESS.2019.2903816, vol. 7, 2019, pp. 32854-32866.

(Continued)

*Primary Examiner* — Sangseok Park

(57) ABSTRACT

A method for operating a parent device, such as a coordinator or router, in a ZigBee network includes monitoring a network for a potential network attack and changing an operating mode from a first mode of operation to a second mode of operation if a potential network attack is detected. In the first mode of operation the parent device is configured to accept unsecured rejoin requests. In the second mode of operation the parent device is configured not to accept unsecured rejoin requests during a first time interval and to accept unsecured rejoin requests during a second time interval.

21 Claims, 7 Drawing Sheets

(56) References Cited

U.S. PATENT DOCUMENTS

2011/0314163 A1* 12/2011 Borins .................... H04W 4/08 709/227
2014/0047547 A1* 2/2014 Mahadik ............. H04L 63/1408 726/25

OTHER PUBLICATIONS

Wang Jincheng : "Zigbee's Network Rejoin Procedure for IoT Systems: Vulnerabilities and Implications", Oct. 26, 2022, pp. 292-307, Proceedings of The 1 St ACM Sigspatial International Workshop on Geospatial Knowledge Graphs, ACMPUB27, New York, NY, USA.

Zigbee Alliance: "ZigBee Specification—ZigBee Document, 05-3474-21",Aug. 5, 2015, pp. 1-565.

* cited by examiner

150

NETWORK DEVICE AND METHOD OF OPERATION OF A DEVICE IN A NETWORK

CROSS-REFERENCE TO RELATED APPLICATIONS

This application claims the priority under 35 U.S.C. § 119 of Romania application no. A202300566, filed on 10 Oct. 2023, the contents of which are incorporated by reference herein.

FIELD

This disclosure relates to a device and method of operation of a device in an IEEE 802.15.14 (ZigBee) network.

BACKGROUND

Personal area networks (PAN) such as ZigBee networks operating according to the IEEE 802.15.14 standard typically consist of a number of low power devices which have different classes defined as ZigBee coordinator (ZC), ZigBee router (ZR) and ZigBee end-device (ZED) within a network. Typically the devices in a ZigBee network only require intermittent data transmissions using relatively low data rates. Such devices may be for example energy monitors, wireless light switches and sensors. ZigBee networks may be beacon-enabled whereby ZC and ZR devices transmit periodic beacons to advertise their presence to other network nodes. ZC devices may be referred to as parent devices, ZR devices may be referred to as parent or child devices depending on their position in the network relative to another node. ZR devices may also be referred to as repeaters. ZED devices may also be referred to as child devices. ZED devices such as motion sensors, temperature sensors may frequently drop-off the network by entering a sleep mode and then subsequently rejoin the network using an insecure rejoin feature which is implemented as part of the ZigBee standard and also referred to herein as an unsecure rejoin.

SUMMARY

Aspects of the disclosure are defined in the accompanying claims. In a first aspect, there is defined a method for operating a parent device in a ZigBee network, the method comprising: monitoring a network for a potential network attack; in response to detecting a potential network attack, changing an operating mode from a first mode of operation to a second mode of operation; in the first mode of operation the parent device is configured to accept unsecured rejoin requests; and in the second mode of operation the parent device is configured to not accept unsecured rejoin requests during a first time interval and to accept unsecured rejoin requests during a second time interval.

In some embodiments, the method further comprises: in response to not detecting a potential network attack, changing an operating mode from the second mode of operation to the first mode of operation. In some embodiments, the second time interval is a rejoin time interval. In some embodiments, the method further comprises: in response to detecting a potential network attack broadcasting a signal including the rejoin time interval. In some embodiments, the rejoin time interval is randomly generated. In some embodiments, monitoring the network for a potential network attack comprises monitoring a rate of unsecured rejoin requests. In some embodiments, the method further comprises detecting a potential network attack if the rate of unsecured rejoin requests is greater than or equal to the rejoin request rate threshold value. In some embodiments, monitoring the network for a potential network attack comprises monitoring a rate of fill of a neighbor table. In some embodiments, the method further comprises: detecting a potential network attack if the rate of fill of the neighbor table is greater than or equal to a rate of fill threshold value.

In some embodiments, the method further comprises: in the first mode of operation, transmitting a private network parameter to a child device joining the network; and in the second mode of operation, transmitting a publicly disclosable parameter comprising a network key protected by the private network parameter. In a second aspect, there is defined a method for operating a child device in a ZigBee network, the method comprising: receiving a private rejoin parameter from a parent device; entering a sleep mode of operation; exiting a sleep mode of operation; extracting a network key from a received beacon frame transmitted from the parent device using the private rejoin parameter; and transmitting a secure rejoin request.

In a third aspect, there is defined a parent device for a ZigBee network, the parent device comprising: a processor; a memory coupled to the processor; and a transceiver coupled to the processor; wherein the processor is configured to: monitor a network for a potential network attack; in response to detecting a potential network attack, change an operating mode from a first mode of operation to a second mode of operation; in the first mode of operation accept unsecured rejoin requests; and in the second mode of operation not accept unsecured rejoin requests during a first time interval, and accept unsecured rejoin requests during a second time interval. In some embodiments, in response to not detecting a potential network attack, the processor is further configured to change the operating mode from the second mode of operation to the first mode of operation.

In some embodiments, the parent device is further configured to: in the first mode of operation, transmit a private network parameter to a child device joining the network; and in the second mode of operation, transmit a publicly disclosable parameter comprising a network key protected by the private network parameter. In some embodiments, the second time interval is a rejoin time interval. In some embodiments, the parent device is further configured to: in response to detecting a potential network attack broadcasting a signal including the rejoin time interval. In some embodiments, the memory comprises a neighbor table and wherein the processor is further configured to monitor the network for a potential network attack by monitoring a rate of fill of the neighbor table. In a fourth aspect, there is defined a child device for a ZigBee network, the child device comprising: a processor; a memory coupled to the processor; and a transceiver coupled to the processor; wherein the processor is configured to: receive a private rejoin parameter from a parent device; enter a sleep mode of operation; exit a sleep mode of operation; extract a network key from a received beacon frame transmitted from the parent device using the private rejoin parameter; and transmit a secure rejoin request. Embodiments of the child device and parent device may be included in a ZigBee (IEEE 802.15.14) network. The parent device may be a ZigBee Coordinator or ZigBee Router. The child device may be a ZigBee Router or ZigBee End Device.

BRIEF DESCRIPTION OF THE DRAWINGS

In the figures and description like reference numerals refer to like features. Embodiments are now described in detail, by way of example only, illustrated by the accompanying drawings in which.

Figure 1A:
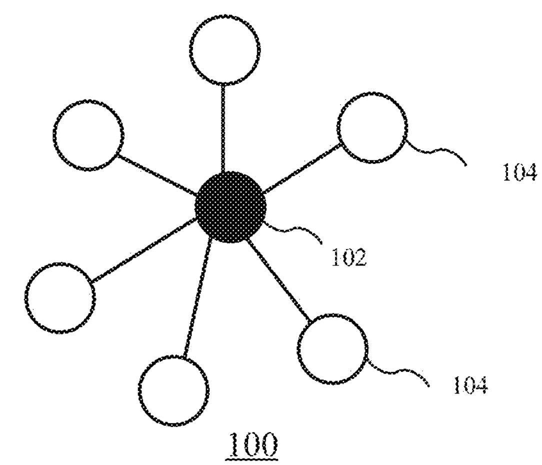
FIG. 1A shows an example ZigBee network with a star topology.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

Figure 1B:
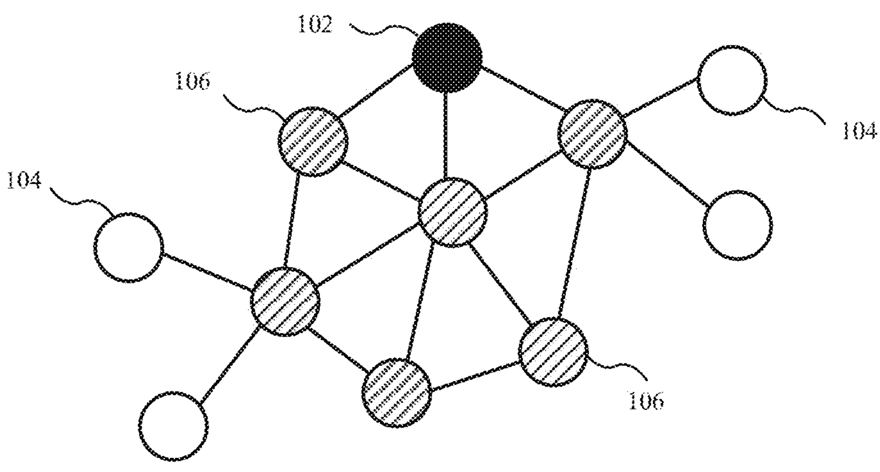
FIG. 1B shows an example ZigBee network with a mesh topology.
Figure 1C:
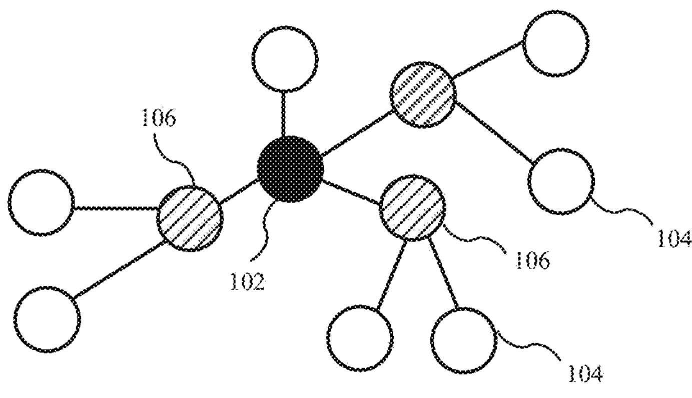
FIG. 1C shows an example ZigBee network with a cluster tree topology.

FIGS. 1A, 1B, 1C shows example topologies of various different ZigBee networks. FIG. 1A shows a star network 100 with the ZC device 102 at the centre connected to a number of ZED devices 104. FIG. 1B shows a mesh network 110 with the ZC device 102, a number of ZR devices 106 and ZED devices 104. FIG. 1C shows a cluster tree network 120 with the ZC device 102, a number of ZR devices and ZED devices 104.

In each of the networks 100, 110, 120, there is a single ZC device 102 which forms the root of the network tree. The ZC device 102 typically stores information about the network, including acting as the trust center and repository for security keys. The ZR devices 106 may execute an application function and also act as routers within the networks 110,120 passing data on to other ZR devices 106 and ZED devices 104. A ZED device 104 cannot relay data from other devices but only communicate with one parent device which is either a ZR device 106 or ZC device 102. A ZED device 104 may be battery powered and may "sleep" for long periods of time to preserve battery life. Network connectivity information may be stored in neighbor tables for each ZC device 102 and ZR device 106.

In the normal flow of operation within the ZigBee network, a device wishing to join an already formed ZigBee network will perform the standard initial joining procedure through media access control address (MAC) Association by performing an active scan and sending a Beacon Request. Potential parent devices within range will respond with Beacon frames to indicate if they allow new devices to join or if they have capacity for child devices. Upon selecting an appropriate parent device, the new ZED device 104 will perform Association Request/Association Response, obtain the Network Key from the Trust Center, which is typically the ZC device 102, via the Transport Key command encrypted at the ZigBee Application Support Sublayer (APS). The ZED device 104 then will proceed to announce itself to the network. A ZED 104 will additionally perform the End Device Timeout Request/Response procedure with its parent to establish the keep alive mechanisms and age-out period.

Figure 2:
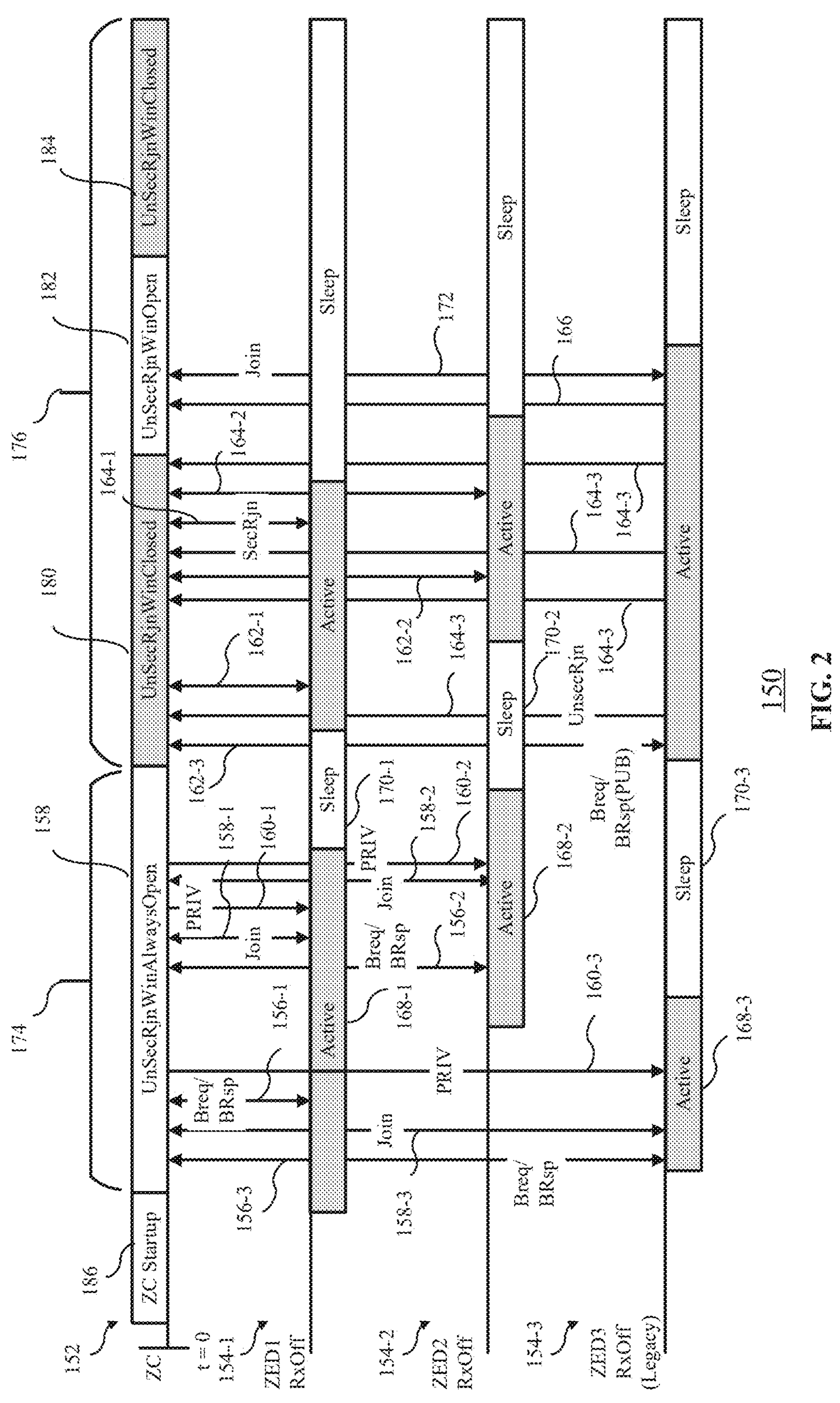
FIG. 2 illustrates an example timing diagram showing the operation of a ZigBee network including a ZC device and three ZED devices according to an embodiment.

FIG. 2 illustrates an example timing diagram showing the operation of a ZigBee network 150 including a ZC device 152 and three ZED devices 154-1, 154-2, 154-3 according to an embodiment. ZED device 154-3 is referred to as a legacy device which does not implement the additional functionality described herein. As illustrated, the ZED devices 154-1, 154-2, 154-3 operate as "RxOff" meaning that the device is unable to receive or transmit signals when in a "sleep" mode in contrast to "RxOn" ZED devices which can "listen" while in sleep mode. Referring first to the timing diagram for the ZC device 152, after an initial start-up phase 186, in a first mode of operation 174, which may be referred to as a normal mode the ZC device 152 accepts unsecured rejoin requests. During respective active phases 168-1, 168-2, 168-3, the ZED devices 154-1, 154-2, 154-3 may send beacon requests and receive beacon responses from the ZC 152 shown respectively as beacon requests/acknowledges 156-1, 156-2, 156-3. The respective ZED devices 154-1, 154-2, 154-3 may then initially join the network by association request/response protocol shown respectively as join requests/join acknowledge 158-1, 158-2, 158-3. In addition, after joining the network a network private parameter (PRIV) is transmitted 160-1, 160-2, 160-3 from the ZC device 152 to the ZED devices 154-1,154-2,154-3. The non-legacy ZED devices 154-1, 154-2 receive and store the network private parameter (PRIV) from the ZC device 152. The legacy ZED device 154-3 is not adapted to understand the network command including the private network key so the transmission is ignored.

The ZC device 152 may detect an attack on the network which may be for example be an attack by a device by sending multiple unsecure rejoin requests to the ZC device 152 or other parent device which fills up the neighbor table. The ZC device 152 may determine that an attack is probably taking place by monitoring the fill level and or the fill rate of the neighbor table compared to a threshold value. If the fill level exceeds a fill level threshold value and/or the fill rate exceeds a fill rate threshold value then an attack is deemed to be happening and the ZC device 152 switches to a second mode of operation 176 which may also be referred to a resource limited mode of operation. In this second mode of operation 176, the open rejoin window 182 during which unsecured rejoin requests are permitted is duty cycled with the closed rejoin window 180, 184 where unsecured rejoin requests are not permitted. During this resource limited mode 176 secure rejoin requests may still be allowed. As illustrated, the third legacy ZED device 154-3 becomes active following a sleep period 170-3 and after beacon request/beacon response 162-3 makes multiple unsecured rejoin requests 164-3 during the unsecured rejoin closed window 180. These unsecured rejoin requests 164-3 are ignored by the coordinator device ZC 152. The legacy ZED device 154-3 then makes an unsecured rejoin request 166 during the unsecured rejoin open window 182, receives the join acknowledge 172 and is allowed to rejoin the network.

During the resource limited mode 176, the ZC device 152 may transmit a vendor specific information element (IE) in a publicly disclosable parameter (PUB) containing the network key protected by the private network parameter. This may be included in the beacon response packet 162-1, 162-2, 162-3 provided to the respective ZED devices 154-1, 154-2, 154-3. The compatible ZED devices 154-1, 154-2 may decode the vendors specific ID present in the beacon response packet and extract the PUB parameter. The ZED devices 154-1, 154-2 may then unprotect the received IE and extract the network key by applying the reverse function to that used for protecting it. The ZED devices 154-1, 154-2 may then transmit secure rejoin requests 162-1, 162-2 and securely rejoin 164-1, 164-2 the network which occurs during the time interval 180 when unsecured rejoins are not permitted.

ZigBee network 150 addresses a problem with a denial of service (DDOS) attack. End devices deployed in the field may go to sleep for long periods of time in order to save power. A problem that can arise during that time is that a directed attack can be performed on the parent devices. An attacker smart device which is MAC compliant and capable of changing its IEEE Extended Address can start sending multiple unsecure Rejoin Requests to the parent, filling up the neighbor table with invalid entries. The parent device is required to announce the unsecure rejoin attempts to the Trust Center and wait for it to authenticate and pass the Network Key for all these new requests. Since they are not legitimate devices which have an established Link Key with the Trust Center, those requests will be ignored, but the entries in the Child/Neighbor Table on the parent will be discarded only after an authentication timeout expires. If the sleeping end device was not active for a sufficient period, the parent might have expired its entry and replaced it with one of the fake addresses from the attacker. On the next data poll, the end device will be instructed to perform a Leave with Rejoin, only the parent has no more space to accommodate it now and will respond with Rejoin status PAN AT CAPACITY resulting in a denial of service for the legitimate device.

Completely disallowing unsecure rejoins may not be possible since there are legitimate cases when a device might perform an unsecure rejoin, for example if a device misses a network key update and needs to perform a Trust Center rejoin using its Unique Trust Center Link Key.

ZigBee networks 150 may detect a network attack and trigger a safe mode of operation throughout the network which will limit resource exhaustion. Once the conditions that marked the attack fall back under a specified threshold the network will switch back to a normal operating mode. The inputs for detecting the unsecured rejoin attack may include the number of received unsecured rejoin requests during a fixed time period and/or a watermark on the routing device's neighbor table. Once a device detects that the number of rejoins passes a set threshold and the neighbor table is being filled up to the selected watermark, the resource limiting mode of operation may be triggered throughout the network and unsecured rejoin requests are dropped outside of a defined allowed window. In some examples, the parent node that detected the attack may signal the switch by using a broadcast NWK Status Command with a new status code to identify entering the safe mode of operation. This avoids centralizing the security and/or creating a lot of overhead, since every ZR device may restrict rejoin requests without tunneling data to the ZC device or creating a high computing overhead. Embodiments creates a set of specific rules inside the network that are communicated to every joining device and the joining devices must act accordingly to become robust against a DDOS attack where anything can be simulated successfully except time.

Figure 3:
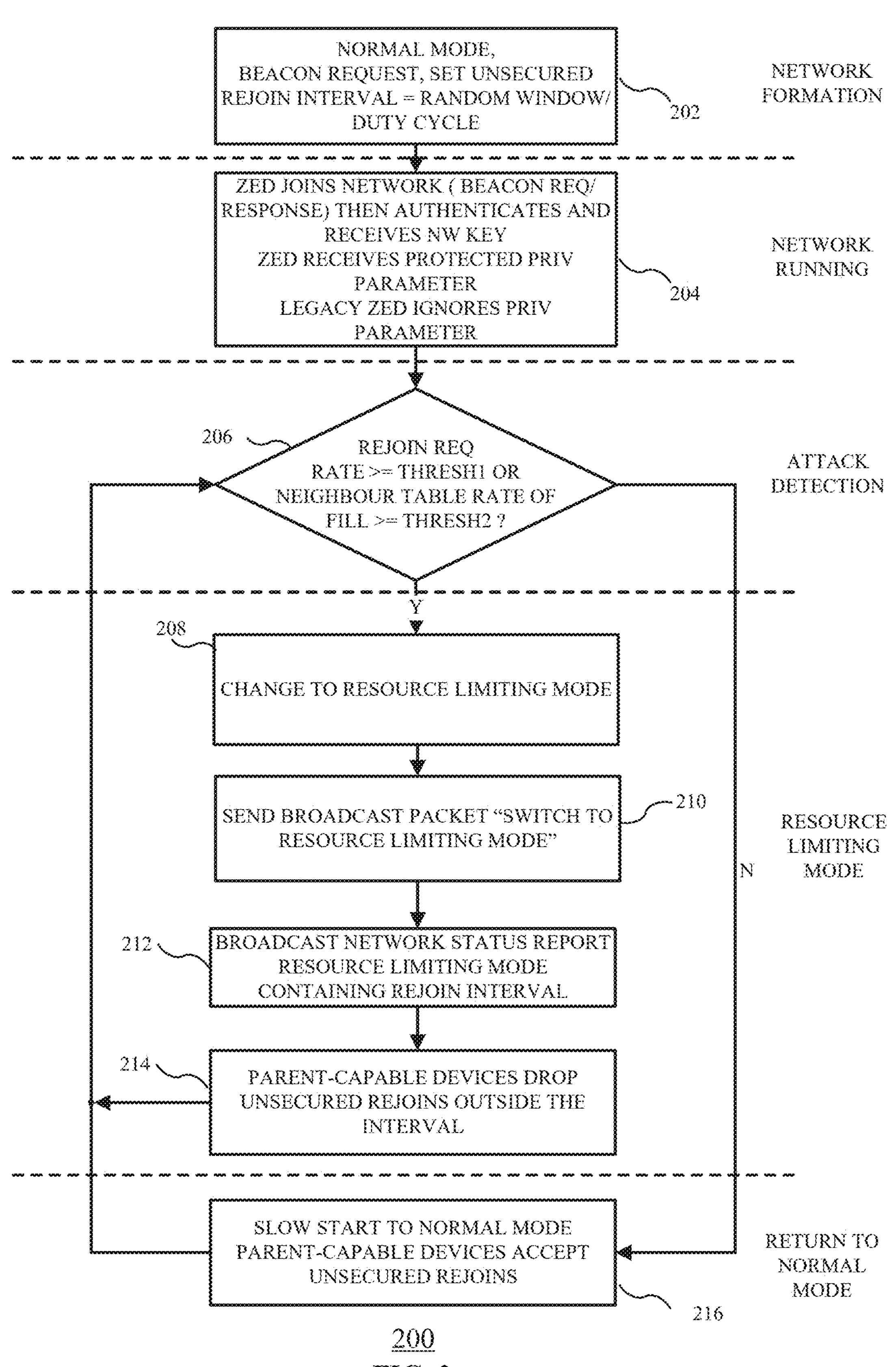
FIG. 3 illustrates a method of operation of a ZigBee network including one or more parent devices and one or more child devices according to an embodiment.

FIG. 3 illustrates a method of operation 200 of a ZigBee network including one or more parent devices and one or more child devices according to an embodiment. In step 202 during the network formation, the network is in a normal mode of operation and the parent devices may receive beacon requests and set the unsecured rejoin interval as a random time window duration or duty cycle between allowed unsecured rejoin requests (open window) and unallowed unsecured rejoin requests (closed window). In step 204 a child device such as a ZED device may join the network via beacon request/response and association request/response. The ZED device then authenticates and receives the network (NW) key. A ZED device according to an embodiment then receives the protected private (PRIV) parameter via a NWK Command. A legacy ZED device ignores the PRIV parameter as it does not understand this command. In step 206, one or more of the parent devices may monitor whether the rejoin request rate is greater than the first threshold value and the neighbour table rate of fill up to a watermark value is greater than or equal to a second threshold value. If both conditions are met in step 206, it is presumed that an attack is taking place. The method then proceeds to step 208 and the parent device changes to resource limiting mode of operation. In step 210, the parent device that detected the attack may send a broadcast packet "switch to resource limiting mode" to the rest of the network. In step 212 the parent device sends a network status report with the rejoin window parameter. In step 214 all parent capable devices receiving the broadcast packet and window parameter will then drop unsecured rejoin requests outside the interval specified by the rejoin window parameter in step 212. Following step 214, the method returns to 206 where the monitoring for a potential attack continues. If either the rejoin request rate is less than the first threshold value or the rate of fill of the neighbour table is less than the second threshold value, no attack is detected and the network returns to a normal mode in step 216. Parent capable devices will then accept unsecured rejoin requests unconditionally. Following from step 216, the method then returns to step 206.

Figure 4:
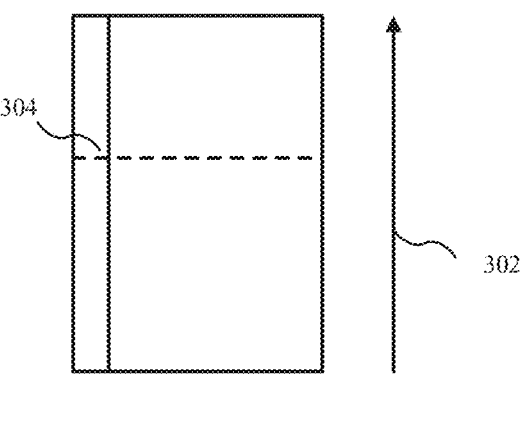
FIG. 4 shows a neighbor table with watermark level.
Figure 5:
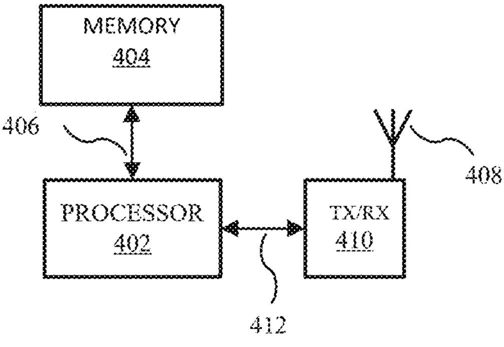
FIG. 5 illustrates an example ZigBee device.

FIG. 4 illustrates a neighbour table 300 including watermark level 304 which may be for example 70% of the capacity of the neighbour table. The neighbour table may be filled sequentially in the direction indicated 302. The fill rate monitored to determine whether a potential network attack is occurring may be the time taken to fill the neighbor table to the watermark level 304. FIG. 5 illustrates an example implementation of a network device 400 including a processor 402 having a connection 406 to memory 404. The processor 402 has a further connection 412 to a transceiver 410 having an antenna 408. The network device 400 may be implemented as a ZC, ZR or ZED device depending on the software being executed by the processor 402. The neighbour table 300 may be implemented as part of the memory 404.

Figure 6:
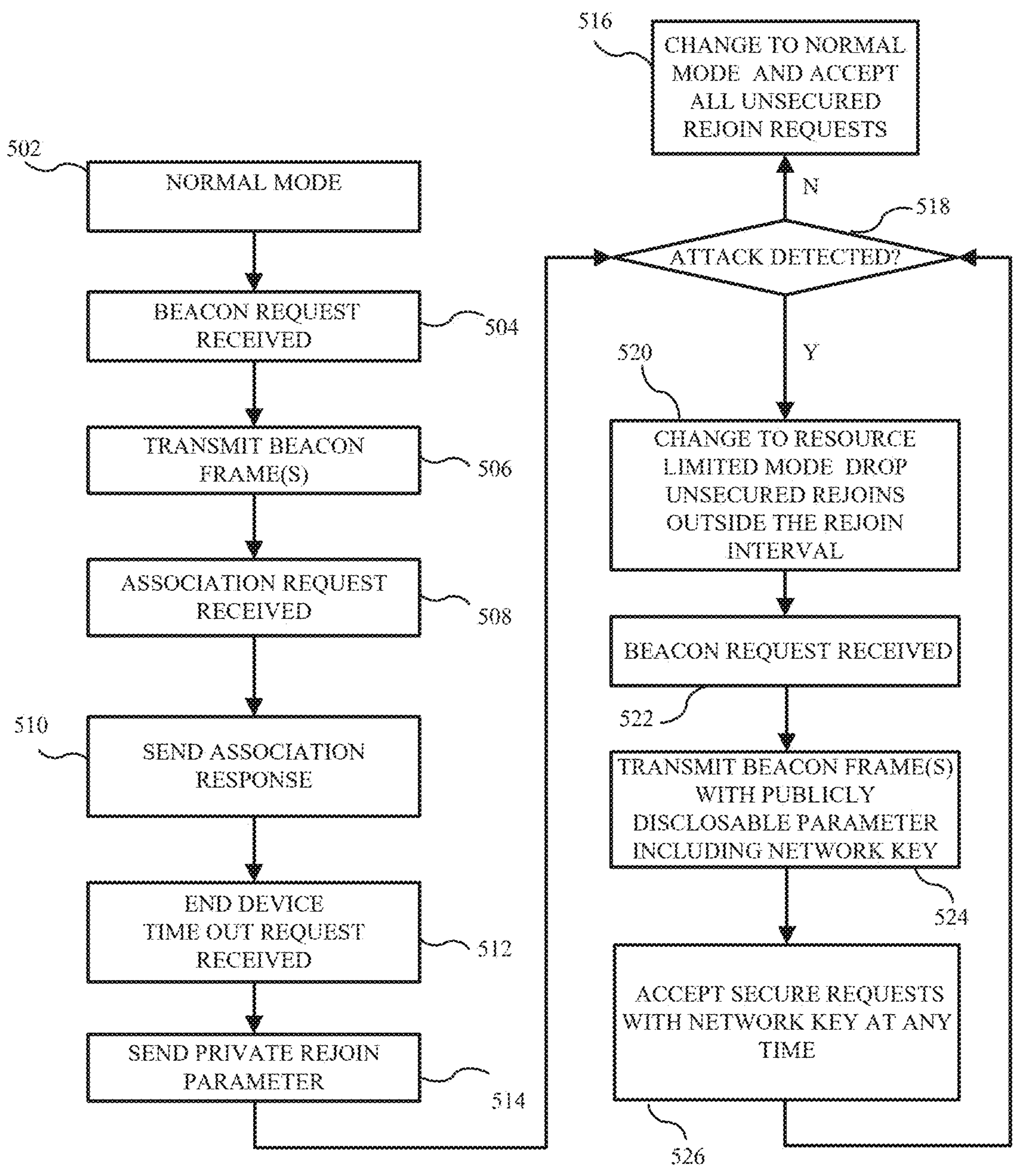
FIG. 6 illustrates a method of operation of a parent device in a ZigBee network according to an embodiment.

FIG. 6 shows a method of operation of a parent device 500 in a ZigBee network according to an embodiment. In step 502 the parent device is in a normal mode of operation. In step 504, a beacon request is received, and the parent device then transmits beacon frames in response in step 506. In step 508, an association request is received from another network mode which may be ZR device or ZED device. In step 510 an association response is transmitted. If the connecting device is a ZED device, then in step 512 an end device timeout request may be received and the parent device may then transmit a private rejoin parameter using a network command in step 514. In step 518, the parent device may run a monitoring process to detect a potential network attack. This could for example be achieved by monitoring the fill rate of the neighbour table or the rejoin request rate as previously described. Alternatively or in addition a broadcast may be received from another parent device indicating a potential network attack and including a rejoin interval value. If a potential network attack is not been detected then, in step 516, the parent device changes to a normal mode and accepts all unsecured rejoin requests. If a potential network attack is detected in step 520, the method changes to resource limited mode and duty cycles between a rejoin window being open for a duration determined by the rejoin interval which may be a randomly generated value and the rejoin window being closed. Any unsecured rejoin requests outside the open rejoin window are ignored. Following from step 520, in step 522 a beacon request may be received. In response to receiving the beacon request, in step 524 the parent device may transmit beacon frames with the publicly disclosable parameter (PUB) including the network key. In step 526, the parent device may then accept secure rejoin requests at any time from ZED devices which can provide the network key. The method may then return to step 518 to determine whether a potential network attack is occurring.

Figure 7:
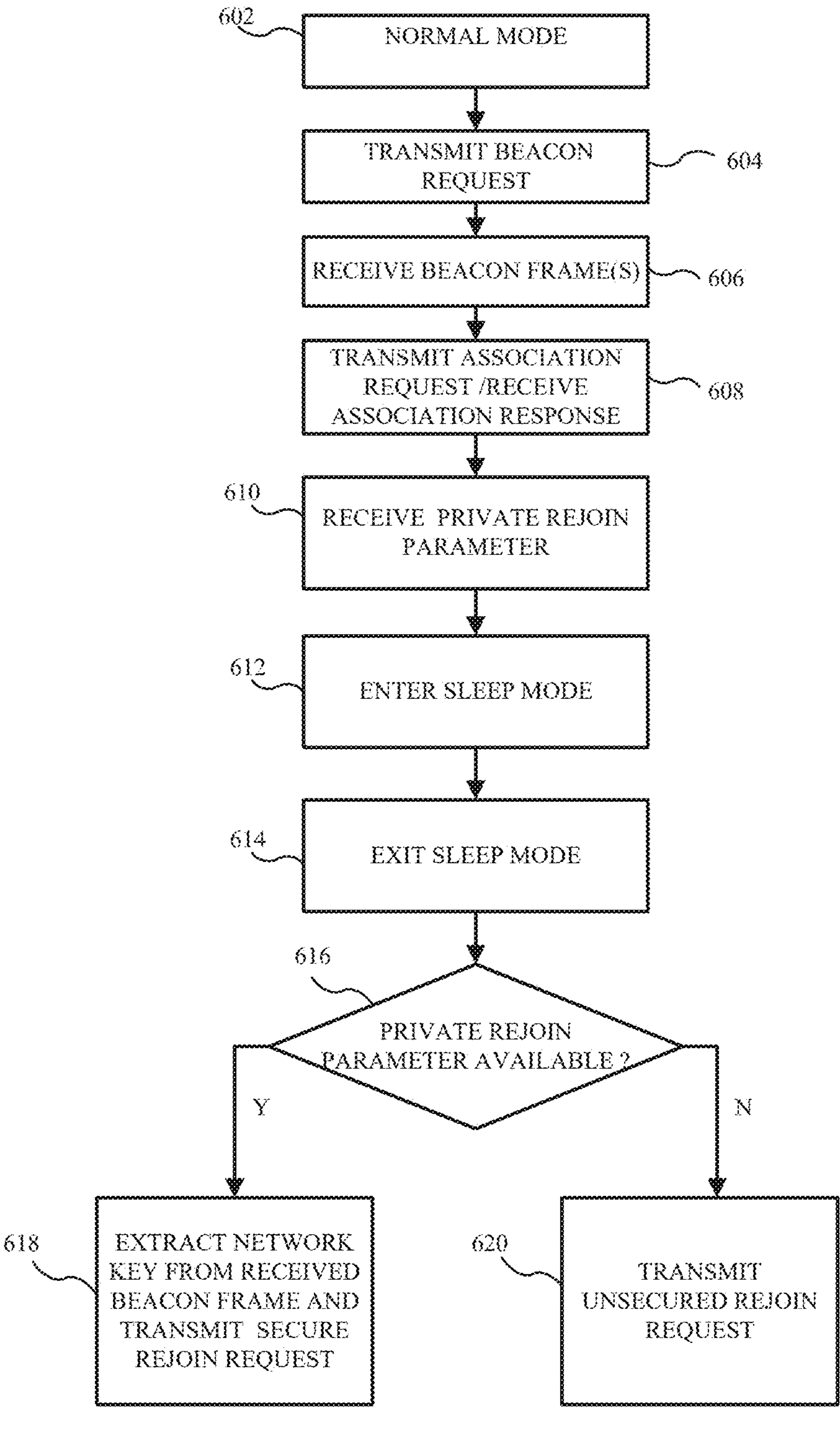
FIG. 7 illustrates a method of operation of a child device in a ZigBee network according to an embodiment.

FIG. 7 shows a method of operation of a child device 600 in a ZigBee network according to an embodiment. The child device 600 may be for example a ZigBee end device. In step 602 the child device is in a normal mode of operation. In step 604, the child device may transmit a beacon request and in response may receive beacon frames in step 606. Following receiving beacon frames, the child device may transmit an association request in step 608 and receive and association response. In step 610 the child device may receive the private rejoin parameter (PRIV) via a network command. At some point after carrying out the required operation or operations, the child device may enter a sleep (low-power) mode in step 612. In step 614 the child device may exit sleep mode and in step 616 the child device may check whether a private rejoin parameter (PRIV) is available. If the private rejoin parameter is available, then in step 618 the child device may extract the network key and transmit a secure rejoin request on exiting sleep mode which may be accepted at any time. Returning to step 616 if the private rejoin parameter is not available then in step 620 an unsecured rejoin request may be transmitted.

Figure 8:
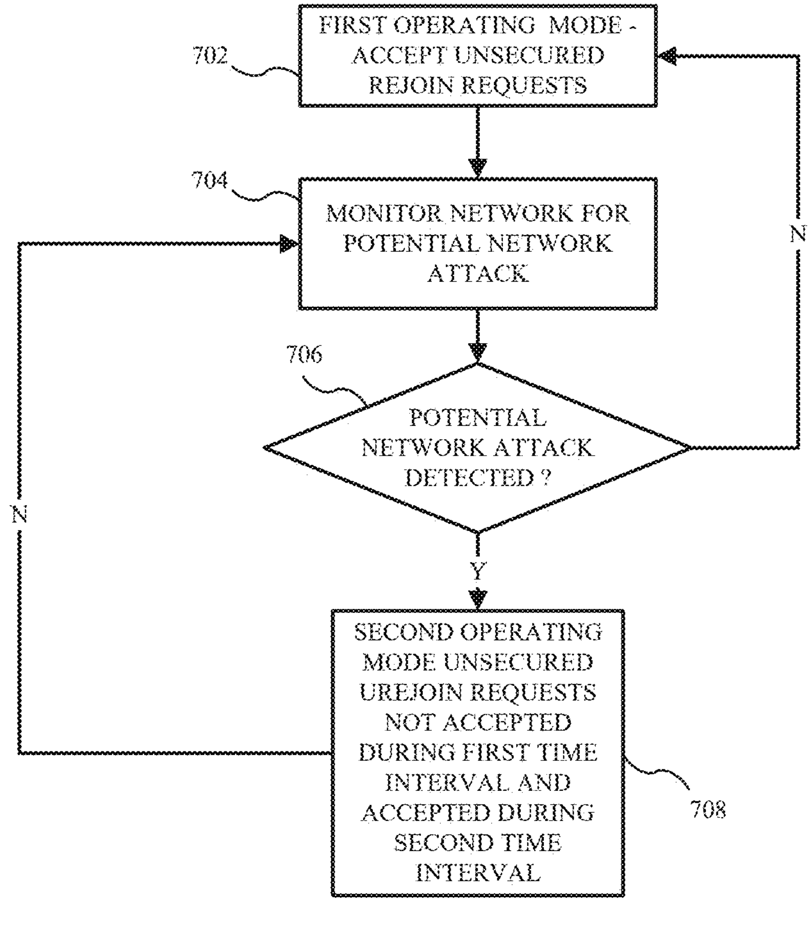
FIG. 8 illustrates a method of operation of a parent device in a ZigBee network according to an embodiment.

FIG. 8 shows a method of operation of a parent device 700 in a ZigBee network according to an embodiment. The parent device may be a ZigBee router or ZigBee Coordinator. In step 702, the parent device may be in a first operating mode in which all unsecured rejoin requests are accepted. In step 704, the parent device may monitor the network for a potential network attack. In step 706, the parent device may check to see if a potential network attack has been detected. If a potential network attack has been detected, then the method proceeds to step 708 where the parent device changes to a second operating mode in which unsecured rejoin requests are not accepted during first time interval and accepted during second time interval. In this operating mode, the parent device may duty cycle between the first time interval and the second time interval. After step 708, the method 700 may return to step 704. Returning to step 706, if a potential network attack is not detected, the method returns to step 702 and remains in or changes to the first operating mode.

ZigBee is present in many IoT devices used for applications such as lighting, metering, and many others. Embodiments described herein may keep functioning as desired even when a network or device is under a DDOS attack, by having the ability to and letting only legitimate devices rejoin the network. Embodiments of parent devices will thus provide more robustness and embodiments of joining devices may bypass completely the problem of re-joining the network un-securely by providing a way to retrieve the security material needed for a Secured Rejoin.

Embodiments describe a ZigBee Parent device capable of entering a safe mode where it employs a technique for limiting exhaustion of core resources, preventing it from performing its normal duty. By accepting unsecured rejoin requests only in specific time windows unknown by unauthorized members of the network parent devices implementing this feature will limit the exchange of authentication messages with the Trust Center and avoid allocating entries in child and neighbor tables for those unauthorized or malicious devices that can systematically drain resources without any intent of being part of the network. Furthermore, the authorized members of the network (devices which at some point were present and fully authenticated) who initially had a legitimate reason for performing an unsecured rejoin will have been provided a protected network mechanism through which they can recover the network key during the rejoin process and perform it securely, thus eliminating any unsecure rejoins and extra authorization and exchange of security material with the Trust Center.

Embodiments may mitigate against resource exhaustion for ZigBee parent devices (ZigBee Coordinator, ZigBee Router). In a secured centralized ZigBee network, devices are allowed to perform an Unsecure Rejoin at the network layer to any parent device and the network will rely on the Trust Center device to further authenticate and allow access to the network by passing the security material. The resources on potential parent devices can be potentially exploited since they are required to provision resources for any device that performs an unsecure rejoin until an authentication decision has been made. Devices which are not are not accepted by the Trust Center will be simply ignored and left to timeout, meaning the resources on the parent devices are thus blocked until the authentication timeout expires.

A method for operating a parent device such as a coordinator or router in a ZigBee network is described. The method includes monitoring a network for a potential network attack and changing an operating mode from a first mode of operation to a second mode of operation if a potential network attack is detected. In the first mode of operation the parent device is configured to accept unsecured rejoin requests. In the second mode of operation the parent device is configured not to accept unsecured rejoin requests during a first time interval and to accept unsecured rejoin requests during a second time interval.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method for operating a parent device in a ZigBee network, the method comprising:

monitoring a network for a potential network attack;

in response to detecting a potential network attack, changing an operating mode from a first mode of operation to a second mode of operation;

in the first mode of operation the parent device is configured to accept unsecured rejoin requests;

in the second mode of operation the parent device is configured to not accept unsecured rejoin requests during a first time interval and to accept unsecured rejoin requests during a second time interval; and in response to not detecting a potential network attack, changing an operating mode from the second mode of operation to the first mode of operation.

2. A method for operating a parent device in a ZigBee network, the method comprising:

monitoring a network for a potential network attack;

in response to detecting a potential network attack, changing an operating mode from a first mode of operation to a second mode of operation;

in the first mode of operation the parent device is configured to accept unsecured rejoin requests;

in the second mode of operation the parent device is configured to not accept unsecured rejoin requests during a first time interval and to accept unsecured rejoin requests during a second time interval, wherein the second time interval is a rejoin time interval; and in response to detecting a potential network attack broadcasting a signal including the rejoin time interval.

3. A method for operating a parent device in a ZigBee network, the method comprising:

monitoring a network for a potential network attack;

in response to detecting a potential network attack, changing an operating mode from a first mode of operation to a second mode of operation;

in the first mode of operation the parent device is configured to accept unsecured rejoin requests; and in the second mode of operation the parent device is configured to not accept unsecured rejoin requests during a first time interval and to accept unsecured rejoin requests during a second time interval, wherein the second time interval is a rejoin time interval, wherein the rejoin time interval is randomly generated.

4. The method of claim 1, wherein monitoring the network for a potential network attack comprises monitoring a rate of unsecured rejoin requests.

5. The method of claim 4, further comprising: detecting a potential network attack if the rate of unsecured rejoin requests is greater than or equal to a rejoin request rate threshold value.

6. A method for operating a parent device in a ZigBee network, the method comprising:

monitoring a network for a potential network attack;

in response to detecting a potential network attack, changing an operating mode from a first mode of operation to a second mode of operation;

in the first mode of operation the parent device is configured to accept unsecured rejoin requests;

in the second mode of operation the parent device is configured to not accept unsecured rejoin requests during a first time interval and to accept unsecured rejoin requests during a second time interval, wherein the second time interval is a rejoin time interval; and wherein monitoring the network for a potential network attack comprises monitoring a rate of fill of a neighbor table.

7. The method of claim 6 further comprising: detecting a potential network attack if the rate of fill of the neighbor table is greater than or equal to a rate of fill threshold value.

8. A method for operating a parent device in a ZigBee network, the method comprising:

monitoring a network for a potential network attack;

in response to detecting a potential network attack, changing an operating mode from a first mode of operation to a second mode of operation;

in the first mode of operation the parent device is configured to accept unsecured rejoin requests;

in the second mode of operation the parent device is configured to not accept unsecured rejoin requests during a first time interval and to accept unsecured rejoin requests during a second time interval, wherein the second time interval is a rejoin time interval;

in the first mode of operation, transmitting a private network parameter to a child device joining the network; and in the second mode of operation, transmitting a publicly disclosable parameter comprising a network key protected by the private network parameter.

9. A parent device for a ZigBee network, the parent device comprising:

a processor;

a memory coupled to the processor; and a transceiver coupled to the processor; wherein the processor is configured to:

monitor a network for a potential network attack;

in response to detecting a potential network attack, change an operating mode from a first mode of operation to a second mode of operation;

in the first mode of operation accept unsecured rejoin requests;

in the second mode of operation not accept unsecured rejoin requests during a first time interval, and accept unsecured rejoin requests during a second time interval, and in response to not detecting a potential network attack, change the operating mode from the second mode of operation to the first mode of operation.

10. A parent device for a ZigBee network, the parent device comprising:

a processor;

a memory coupled to the processor; and a transceiver coupled to the processor; wherein the processor is configured to:

monitor a network for a potential network attack;

in response to detecting a potential network attack, change an operating mode from a first mode of operation to a second mode of operation;

in the first mode of operation accept unsecured rejoin requests; and in the second mode of operation not accept unsecured rejoin requests during a first time interval, and accept unsecured rejoin requests during a second time interval;

wherein the parent device is further configured to:

in the first mode of operation, transmit a private network parameter to a child device joining the network; and in the second mode of operation, transmit a publicly disclosable parameter comprising a network key protected by the private network parameter.

11. A ZigBee network comprising the parent device of claim 10 and a child device.

12. The ZigBee network of claim 11 wherein the parent device is one of a ZigBee Coordinator and ZigBee Router and the child device is one of a ZigBee Router and ZigBee End Device.

13. A parent device for a ZigBee network, the parent device comprising:

a processor;

a memory coupled to the processor; and a transceiver coupled to the processor; wherein the processor is configured to:

monitor a network for a potential network attack;

in response to detecting a potential network attack, change an operating mode from a first mode of operation to a second mode of operation;

in the first mode of operation accept unsecured rejoin requests; and in the second mode of operation not accept unsecured rejoin requests during a first time interval, and accept unsecured rejoin requests during a second time interval, wherein the second time interval is a rejoin time interval.

14. The parent device of claim 13, further configured to: in response to detecting a potential network attack broadcasting a signal including the rejoin time interval.

15. A ZigBee network comprising the parent device of claim 13 and a child device.

16. The ZigBee network of claim 15 wherein the parent device is one of a ZigBee Coordinator and ZigBee Router and the child device is one of a ZigBee Router and ZigBee End Device.

17. A parent device for a ZigBee network, the parent device comprising:

a processor;

a memory coupled to the processor; and a transceiver coupled to the processor; wherein the processor is configured to:

monitor a network for a potential network attack;

in response to detecting a potential network attack, change an operating mode from a first mode of operation to a second mode of operation;

in the first mode of operation accept unsecured rejoin requests; and in the second mode of operation not accept unsecured rejoin requests during a first time interval, and accept unsecured rejoin requests during a second time interval;

wherein the memory comprises a neighbor table and wherein the processor is further configured to monitor the network for a potential network attack by monitoring a rate of fill of the neighbor table.

18. A ZigBee network comprising the parent device of claim 9 and a child device.

19. The ZigBee network of claim 18 wherein the parent device is one of a ZigBee Coordinator and ZigBee Router and the child device is one of a ZigBee Router and ZigBee End Device.

20. A ZigBee network comprising the parent device of claim 17 and a child device.

21. The ZigBee network of claim 20 wherein the parent device is one of a ZigBee Coordinator and ZigBee Router and the child device is one of a ZigBee Router and ZigBee End Device.

* * * * *